(12) United States Patent
Machida et al.

(10) Patent No.: US 11,253,104 B2
(45) Date of Patent: Feb. 22, 2022

(54) FRYING TREATMENT APPARATUS

(71) Applicant: NISSIN FOODS HOLDINGS CO., LTD., Osaka (JP)

(72) Inventors: Noriyuki Machida, Osaka (JP); Shigeru Yasuda, Osaka (JP); Takaaki Hibi, Osaka (JP)

(73) Assignee: NISSIN FOODS HOLDINGS CO., LTD., Osaka (JP)

( * ) Notice: Subject to any disclaimer, the term of this patent is extended or adjusted under 35 U.S.C. 154(b) by 611 days.

(21) Appl. No.: 15/560,398

(22) PCT Filed: Mar. 29, 2016

(86) PCT No.: PCT/JP2016/060049
§ 371 (c)(1),
(2) Date: Sep. 21, 2017

(87) PCT Pub. No.: WO2016/158919
PCT Pub. Date: Oct. 6, 2016

(65) Prior Publication Data
US 2018/0092492 A1    Apr. 5, 2018

(30) Foreign Application Priority Data
Mar. 30, 2015  (JP) ............................. JP2015-068552

(51) Int. Cl.
*A47J 37/12*     (2006.01)
*A23L 19/18*    (2016.01)
(Continued)

(52) U.S. Cl.
CPC ............... *A47J 37/129* (2013.01); *A23L 5/10* (2016.08); *A23L 7/109* (2016.08); *A23L 19/18* (2016.08);
(Continued)

(58) Field of Classification Search
CPC ........ A23L 5/11; A23L 7/113; A23V 2002/00; A47J 37/12; A47J 37/1214; A47J 37/1233; A47J 37/1266
(Continued)

(56) References Cited

U.S. PATENT DOCUMENTS 3,733,202 A * 5/1973 Marmor .................... A23L 5/11
                                                            426/441
4,488,478 A   12/1984 Leeper
(Continued)

FOREIGN PATENT DOCUMENTS

JP    3-074093        11/1991
JP    2005-296417    10/2005
(Continued)

OTHER PUBLICATIONS

International Search Report issued in International Application No. PCT/JP2016/060049, dated Jun. 21, 2016, 6 pages with translation.
(Continued)

*Primary Examiner* — Tu B Hoang
*Assistant Examiner* — Vy T Nguyen
(74) *Attorney, Agent, or Firm* — Hamre, Schumann, Mueller & Larson, P.C.

(57) ABSTRACT

A food frying treatment apparatus includes: a frying oil circulation mechanism, which makes frying oil flow out from a frying oil tank on a downstream side and makes the frying oil flow in the frying oil tank on an upstream side by a frying oil inflow device, which ejects the frying oil in an upward direction from a bottom portion side of the frying oil tank; a frying food transport mechanism including a first transport mechanism, which transports the food fed into the frying oil tank on the upstream side in a floating state on a surface of the frying oil, and a second transport mechanism, which transports a frying food subsequently to the first
(Continued)

transport mechanism in an immersed state below the surface of the frying oil in the frying oil tank; and a fried food collection mechanism, which collects a fried food from the frying oil tank.

2 Claims, 3 Drawing Sheets

(51) Int. Cl.
    *A23L 5/10*     (2016.01)
    *A23L 7/109*     (2016.01)

(52) U.S. Cl.
    CPC ....... *A47J 37/1214* (2013.01); *A47J 37/1223* (2013.01); *A23L 5/11* (2016.08)

(58) Field of Classification Search
    USPC .......................... 426/438, 441, 490, 492, 637
    See application file for complete search history.

(56) References Cited

U.S. PATENT DOCUMENTS

| | | | |
|---|---|---|---|
| 4,738,193 A | 4/1988 | Benson et al. | |
| 4,863,750 A * | 9/1989 | Pawlak | A23L 5/11 426/438 |
| 4,867,049 A * | 9/1989 | Johnson | A47J 37/1214 99/330 |
| 4,929,461 A * | 5/1990 | Schonauer | A23L 5/11 426/438 |
| 4,942,808 A | 7/1990 | Benson et al. | |
| 5,137,740 A | 8/1992 | Benson et al. | |
| 5,167,979 A * | 12/1992 | Benson | A47J 37/1214 426/438 |
| 8,808,779 B2 * | 8/2014 | Desai | A23L 19/18 426/438 |
| 10,123,555 B2 * | 11/2018 | Eichenlaub | A23L 19/18 |
| 10,548,341 B2 * | 2/2020 | Barber | A23L 19/18 |
| 2009/0017178 A1 * | 1/2009 | Desai | A23L 19/18 426/438 |
| 2010/0021602 A1 * | 1/2010 | Caridis | A23L 19/18 426/438 |

FOREIGN PATENT DOCUMENTS

| | | |
|---|---|---|
| JP | 3955690 | 8/2007 |
| JP | 2009-165641 | 7/2009 |

OTHER PUBLICATIONS

Written Opinion of the International Searching Authority issued in International Application No. PCT/JP2016/060049, dated Jun. 21, 2016, 3 pages.

* cited by examiner

FRYING TREATMENT APPARATUS

TECHNICAL FIELD

The present invention relates to an apparatus for producing a fried food (of snack type) whose main raw material is a starchy material, made from wheat flour or potato. The present invention more specifically relates to an apparatus for producing noodle strings, potato chips and the like to which a frying treatment is applied. With respect to fried noodle strings, the present invention particularly relates to a frying treatment apparatus for short noodle strings of about 1 to 10 cm.

BACKGROUND ART

Various fried foods (of snack type), whose main raw material is a starchy material, made from wheat flour or potato, are present. For example, many instant noodles are composed of noodle strings having a general length of about 20 to 70 cm. Meanwhile, along with diversification of consumer preferences in recent years, noodle strings with a short length of about 1 to 10 cm which allow a consumer to eat the noodle strings like the consumer eats a soup have become necessary. Particularly, in overseas, there is a high demand for short-noodle products having short noodle strings and allowing a consumer to eat the noodle strings like the consumer eats a soup. In the field of instant noodles as well, the need to produce such noodle strings having a short length is increasing. Here, in the case of instant noodles including short noodle strings, when packaging a group of noodle strings into a container, each of the group of noodle strings is necessarily stored in a separated state rather than in a lump state from a viewpoint of cooking at the time of eating and the other viewpoints.

A fried instant noodle lump composed of noodle strings having the general length of about 20 to 70 cm is prepared such that a group of noodle strings which is cut after gelatinization is stored in a mold referred to as a retainer, and the group of noodle strings is immersed into frying oil in a state where an upper portion of the retainer is covered by a lid. Then, a noodle lump made from one group of noodle strings is obtained where noodle strings are intertwined.

On the other hand, when noodle strings having a short length of about 1 to 10 cm as described above are fried in a state of being likewise stored in a retainer, the noodle strings become a lump made from one group of noodle strings in the same manner as described above. Accordingly, even when a shock is applied to the group of noodle strings, the whole group of noodle strings is not easily separated from each other so that it is difficult to easily obtain fried noodle strings in a separated state after the noodle strings are fried. In addition, when the noodle strings are brought into a lump state, there also arises a problem that a frying treatment is not sufficiently applied to interior portions of the group of noodle strings.

Therefore, the following prior art can be cited as a method for continuously producing a relatively small-sized fried product using a member other than a retainer.

CITATION LIST

Patent Document

Patent Document 1: Japanese Patent No. 3955690

However, the method described in patent Document 1 is a method for continuously producing small fried balls. Accordingly, when it is intended to apply the method to noodle strings larger than small fried balls, it is expected that the noodle strings are not sufficiently fried or a production amount per unit time is not sufficient so that the productivity is reduced. As described above, conventionally, a method for efficiently producing a group of fried noodle strings having a short length of about 1 to 10 cm in a separated state has not been developed.

DISCLOSURE OF INVENTION

Problem to be Solved by Invention

The present invention has been made by inventors of the present invention in view of the above, and it is an object of the present invention to develop an apparatus capable of efficiently producing a group of short noodle strings to which a frying treatment is applied in a separated state. It is also an object to develop a method which is applicable not only to a group of noodle strings but also to other frying foods.

Means for Solving the Problem

The inventors of the present invention have made extensive studies and, as a result, have found that the following method is effective to solve the problem. That is, an apparatus is employed where gelatinized short noodle strings are sequentially fed into a frying oil tank with heated oil, and a group of noodle strings are fried while being transported by a conveyor which is installed on the inside of the frying oil tank. With the employment of the apparatus, the group of noodle strings is partly fried such that the group of noodle strings is transported in a floating manner on the frying oil without being immersed into the frying oil at the beginning state. Thereafter, the group of noodle strings is fried such that the group of noodle strings is transported in an immersed manner into the frying oil for a short time.

Further, the inventors of the present invention have found the following. That is, with an agitation of frying foods caused by making frying oil flow in a fry tank from a bottom portion of the fry tank in an upward direction toward the frying foods being fried in a floating state, the frying foods can be uniformly and efficiently fried. Subsequently, the inventors have completed the present invention.

In other words, the inventors of the present invention found that, by producing a group of noodle strings as described above, while favorable productivity is maintained, the group of noodle strings can be obtained in a separated state after the group of noodle strings is fried. Further, even when the group of noodle strings is obtained in a lump state after the group of noodle strings is fried, the group of fried noodle strings can be easily separated from each other with a small impact. Subsequently, the inventors have completed the present invention.

The inventors of the present invention have also found that the following way is effective in separating fried noodle strings. That is, in the frying oil circulation mechanism of the noodle string frying treatment apparatus, frying oil is ejected from the bottom portion side of a frying oil tank in the upward direction when making the frying oil flow in the frying oil tank. With such ejection of the frying oil, the relative position between frying foods is disturbed so that the frying foods are prevented from being connected with each other.

Furthermore, the inventors of the present invention have made extensive studies and, as a result, have also found the following. That is, when the apparatus of the present invention is applied to sliced potatoes and the like to be fried, and is also applied to a potato chip frying treatment, the apparatus of the present invention is effective in separating fried potato chips. Further, potato chips can be suitably produced at a low temperature or in a short time compared to the conventional technique.

In other words, the inventors of the present invention have found that the apparatus of the present invention has an excellent effect in applying frying treatment to starch-based frying foods having a predetermined size such as short frying noodle strings or potato chips, and the inventors of the present invention have completed the present invention.

That is, according to a first aspect of the present invention, there is provided "A food frying treatment apparatus including:
1) a frying oil tank;
2) a raw material supply mechanism which is configured to feed a raw material food for frying, the raw material supply mechanism being disposed on an upstream side of the frying oil tank;
3) a frying oil circulation mechanism which is configured to make frying oil flow out from the frying oil tank on a downstream side within the frying oil tank, and to make the frying oil flow in the frying oil tank on the upstream side within the frying oil tank by a frying oil inflow device which is configured to eject the frying oil in an upward direction from a bottom portion side of the frying oil tank;
4) a heat exchanger which is configured to reheat the frying oil made to flow out from the frying oil tank;
5) a frying food transport mechanism which is configured to transport a food fed into the frying oil from the upstream side to the downstream side, the frying food transport mechanism being disposed in the oil tank, and including a first transport mechanism which is configured to transport the food fed into the frying oil tank on the upstream side within the frying oil tank in a floating state on a surface of the frying oil, and a second transport mechanism which is configured to transport a frying food subsequently to the first transport mechanism in an immersed state below the surface of the frying oil in the frying oil tank; and
6) a fried food collection mechanism which is configured to collect a fried food from the frying oil tank".

Next, in the frying treatment apparatus, a method is preferably used where a frying treatment is applied to frying foods while the frying foods are transported in a divided state at predetermined intervals by the 5) frying food transport mechanism.

That is, according to a second aspect of the present invention, there is provided "the food frying treatment apparatus according to claim 1, wherein the 5) frying food transport mechanism has a sorting plate which is configured to divide frying foods at predetermined intervals."

The inventors of the present invention also intend to a method for producing a fried food which can be realized by the frying treatment apparatus according to claim 1.

That is, according to third aspect of the present invention, there is provided

"A method for producing a fried food using a frying apparatus where frying oil is made to flow from an upstream side to a downstream side, the frying oil is made to flow out from a fry tank on the downstream side within the fry tank, and the frying oil is made to pass through a heat exchanger and flow in the fry tank, the method including the steps of:

1) feeding a raw material food for frying into the fry tank on the upstream side within the fry tank,
2) frying the raw material food being fried in a floating state on the upstream side within the fry tank,
3) making the frying oil flow in the fry tank on the upstream side within the frying oil tank such that the frying oil is ejected in an upward direction from a bottom portion side of the fry tank;
4) frying a frying food being fried in an immersed state in the frying oil subsequently to the step of frying the raw material food in the floating state; and
5) collecting a fried food which is fried by being immersed in the frying oil from the frying oil tank".

Effect of the Invention

With the use of a frying treatment apparatus of the present invention, fried foods whose main raw material is starch can be efficiently produced in a separated state. Further, even when a noodle lump, where a group of short noodle strings is in a lump state, remains in a target food, the group of fried noodle strings can be easily separated from each other with a small shock.

Figure 1:
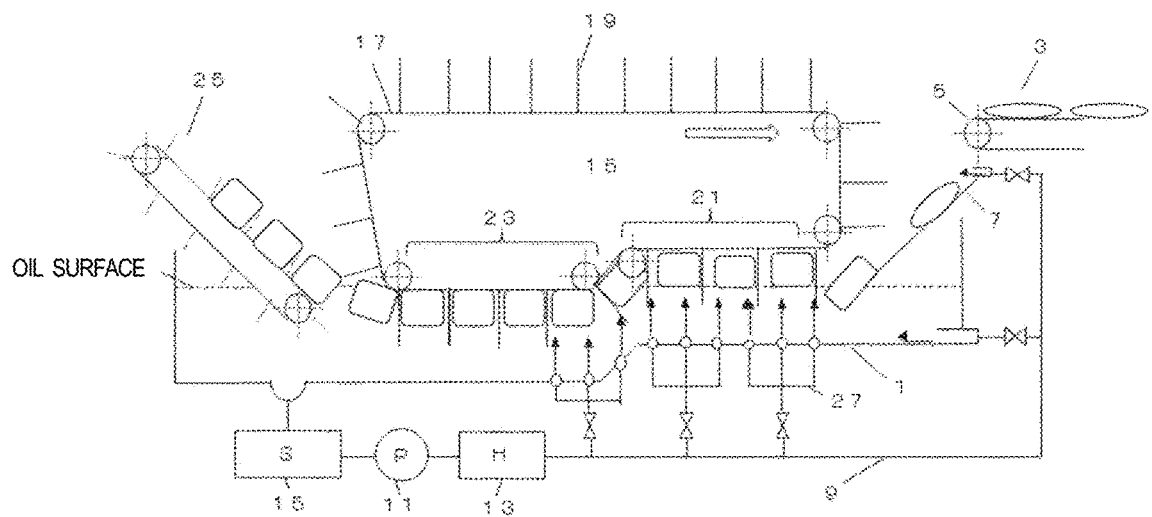
FIG. 1 is a cross sectional schematic view of a noodle string frying treatment apparatus according to a first embodiment of the present invention.

REFERENCE SIGNS LIST 1 frying oil tank
3 food supply mechanism
5 conveyor (food supply mechanism)
7 slope (food supply mechanism)
9 frying oil circulation mechanism
11 pump
13 heat exchanger
15 food transport mechanism
17 conveyor (food transport mechanism)
19 paddle
21 first transport mechanism
23 second transport mechanism
25 collection mechanism
26 collection conveyor
27 frying oil ejection mechanism (from the underside)
29 hole
31 frying oil ejection mechanism (tubular member)
MS group of foods

MODE FOR CARRYING OUT THE INVENTION

Hereinafter, embodiments of the present invention are described with reference to drawings. However, the present invention is not limited to these embodiments.

FIG. 1 is a cross sectional schematic view of a food frying treatment apparatus according to a first embodiment of the present invention.

The frying treatment apparatus of the first embodiment includes: a frying oil tank 1; a feeding equipment (food supply mechanism) 3 which feeds cut foods into the frying oil tank 1; and a frying food transport mechanism 15 having a conveyor 17 which circulates in the inside of the frying oil tank in the longitudinal direction. Paddles 19 are mounted on the conveyor 17 at predetermined intervals, and the paddles 19 convey frying food fed into the frying oil tank 1 to the downstream side while allowing the frying food to be fried. Further, as a fried food collection mechanism 25 for discharging a group of fried foods to the outside of the frying oil tank 1 after the foods are fried, a collection conveyor 26 having paddles is provided to the frying treatment apparatus.

—Frying Oil Tank—

In the present invention, frying oil is poured into the frying oil tank 1. A kind of the frying oil is not particularly limited, and various kinds of oil may be used. For example, vegetable oil, animal oil or other oil may be used as the frying oil. To be more specific, palm oil, soybean oil, corn oil, cottonseed oil or other oil can be named as the vegetable oil, and lard or other oil can be named as the animal oil. It is needless to say that hydrogenated oil may be used when necessary.

In the first embodiment of the present invention, the frying oil tank 1 has an underside disposed at two different heights where a portion of the underside on the upstream side has a high elevation, and a portion of the underside on the downstream side has a low elevation. With such a configuration, a distance from a paddle to the underside in a first transport mechanism described later and a distance from the paddle to the underside in a second transport mechanism retain an approximately constant distance. At the same time, the frying oil smoothly moves from the upstream side to the downstream side.

—Raw Material Food for Frying—

In the present invention, a raw material food for frying means a food raw material before a frying treatment is applied, namely, a food to be fried whose main raw material is starch-based, made from wheat flour or potato.

That is, to be more specific, a group of foods can be named which is prepared such that water is mixed into wheat flour, starch and salts, and the mixture is rolled out, cut and gelatinized (steamed and boiled) and a frying treatment is intended to be applied to such a group of foods. A raw material for potato chips can be also named, which is prepared by slicing potatoes and by applying a blanching treatment to the sliced potatoes. A frying treatment is to be applied to the sliced potatoes. It is needless to say that the present invention is applicable not only to flat potato chips but also to stick-shaped potato sticks and French fries and, further, to corn-based snack products made from corns.

Next, in the present invention, granular products having a size of approximately less than 10 cm can be preferably utilized as a raw material food for frying. It is needless to say that the granular product may be of an elongated type, or may have various shapes such as a square shape or a rectangular shape.

—Raw Material Food Supply Mechanism—

In the present invention, a food supply mechanism 3 is provided, which continuously or intermittently feeds raw material foods to be fried into the frying oil tank. A configuration of the supply mechanism is not particularly limited. However, for example, as shown in FIG. 1, a mode or the like is considered where the food supply mechanism 3 conveys groups of foods prepared by cutting gelatinized foods, and a distal end of the conveyor 5 extends to an area above the frying oil tank 1.

A mode may also be employed where a food raw material to be fried is cut, and is directly fed into the fry tank. A configuration as shown in FIG. 1 may also be employed where a slope 7 is provided, and foods to be fried slide down along the slope 7.

—Frying Oil Circulation Mechanism—

In the present invention, a frying oil circulation mechanism 9 is provided. In the first embodiment of the present invention, to make frying oil circulate, the frying oil is made to flow out through an outflow port disposed in the vicinity of a downstream portion in the frying oil tank 1 by a pump 11, and is made to flow in the frying oil tank 1 by the pump 11 on the upstream side within the frying oil tank 1. With such a configuration, it is possible to form a flow of the frying oil in the frying oil tank from the upstream side to the downstream side. Further, groups of foods fed into the frying oil can be smoothly transported to the downstream side without a problem and hence, the groups of foods can be transported from the upstream side to the downstream side in conformity with a circulation of the paddles.

In the first embodiment of the present invention, the frying oil made to flow out through the outflow port on the downstream side is made to flow in the frying oil tank 1 by the pump 11 from the bottom portion side of the frying oil tank 1 at an end portion on the upstream side and, at the same time, the frying oil is also supplied to the slope 7 along which groups of foods on the above-described food supply mechanism 3 slide down into the frying oil tank 1. With such supply of the frying oil, groups of foods can smoothly slide down along the slope 7.

—Strainer—

In the first embodiment of the present invention, a tube-shaped passage is provided as the frying oil circulation mechanism 9, which collects frying oil on the downstream side from the frying oil tank 1, and transfers the frying oil to a heat exchanger 13. The circulation mechanism 9 is configured such that, in collecting the frying oil from the frying oil tank 1, the frying oil passes through a strainer 15. In the present invention, a group of foods having a length of about 1 to 10 cm is a target material so that there may be a case where extremely small fragments of noodles are irregularly generated. Accordingly, in making frying oil circulate, a step of filtering the frying oil is important. In the present invention, various types of strainers such as a wire-mesh type strainer or a strainer of a type which further uses a filter paper may be utilized as the strainer. It is preferable that, for filtering frying oil, a wire-mesh or filter paper of a type which can be rotated or made to circulate be utilized.

—Heat Exchanger—

In the present invention, the heat exchanger 13 for reheating frying oil is provided on the downstream side of the pump so as to reheat the oil which is made to flow out from the frying oil tank 1. In the present invention, a kind of the heat exchanger 13 is not limited, and various types of heat exchanger may be utilized as the heat exchanger 13.

—Frying Food Transport Mechanism—

In the present invention, the frying food transport mechanism 15 is provided, which transports groups of foods in the frying oil tank 1. In the first embodiment of the present invention shown in FIG. 1, the frying food transport mechanism formed of the conveyor 17 is disclosed. The conveyor 17 is formed such that a chain is disposed on both edges of a fluid permeable net-like belt made of stainless steel, and a large number of paddles 19 are formed on the chain at predetermined intervals.

Each paddle is formed of a laterally elongated rectangular plate, and both ends of the paddle are disposed at positions which allow the paddle to be brought into contact with inner surfaces of both lateral walls of the frying oil tank 1. The conveyor 17 includes six sprockets on each surface (6×2 (both surfaces)) so as to transport the chain. It is needless to say that a guide or the like may be utilized in place of the sprockets when appropriate.

The conveyor 17 is rotatably driven by a drive device connected to a rotary shaft fixedly mounted to the predetermined sprockets.

Next, in the frying treatment apparatus of the present invention, the frying food transport mechanism 15 includes: a first transport mechanism 21 which transports foods fed into the frying oil tank on the upstream side within the frying oil tank in a floating state on a surface of frying oil; and a second transport mechanism 23 which transports the frying food subsequently to the first transport mechanism 21 in an immersed state below the surface of the oil in the frying oil tank. A frying treatment is applied to groups of fed foods in these transport steps.

The first transport mechanism 21 is configured such that a plurality of groups of foods fed by the food supply mechanism 3 are fried in a floating state rather than being forcibly immersed into frying oil (float frying).

In this embodiment, frying in the floating state (float frying) means a state where groups of foods are not intentionally (actively) immersed into oil. Accordingly, it is needless to say that when a plurality of groups of foods are in a state of flowing while floating on frying oil, the groups of foods may be in an overlapping state so that some of the foods on the lower side may be in an immersed state into the oil.

In the same manner, when a large amount of foods is fed between the paddles as in the case of the first embodiment of the present invention, some groups of foods on a lower portion are brought into an immersed state into frying oil in the same manner as described above. In the present invention, frying in a floating state also includes such a state. Groups of foods are in the floating state so that a relative position between the groups of foods is easily changed.

The second transport mechanism 23 is provided subsequently to the first transport mechanism 21. With respect to the second transport mechanism 23, foods which are fried in the process performed by the first transport mechanism 21 are transferred to the second transport mechanism 23. In the second transport mechanism 23, a conveyor portion is lowered to a position substantially equal to a liquid surface of the frying oil or below the surface of the frying oil. As described above, groups of foods are deep fried by being forcibly immersed into frying oil (the groups of foods are fried in a state of being forcibly immersed below the surface of the oil).

A frying time in the first transport and a frying time in the second transport are determined depending on foods which are objects to be fried. Assume a case of a group of frying noodle strings, for example. Although frying times vary depending on a ratio of the first transport to the second transport, in the case of a group of noodle strings, on the order of 10 to 60 seconds are required for the first transport, and on the order of 10 to 60 seconds are required for the second transport.

Further, in the case of potato chips, although frying times vary depending on a ratio of the first transport to the second transport, on the order of 45 seconds to 120 seconds are required for the first transport, and on the order of 45 seconds to 120 seconds are required for the second transport.

Various methods may be employed for transferring groups of foods from the first transport to the second transport. That is, as in the case of the first embodiment shown in FIG. 1, groups of foods may be transferred from the first transport to the second transport using a single conveyor device. In the first embodiment of the present invention, a conveyor line is gently inclined between the first transport and the second transport. A mode may be employed where groups of foods are transferred using a plurality of conveyors.

—Frying Oil Ejection Mechanism—

Figure 2:
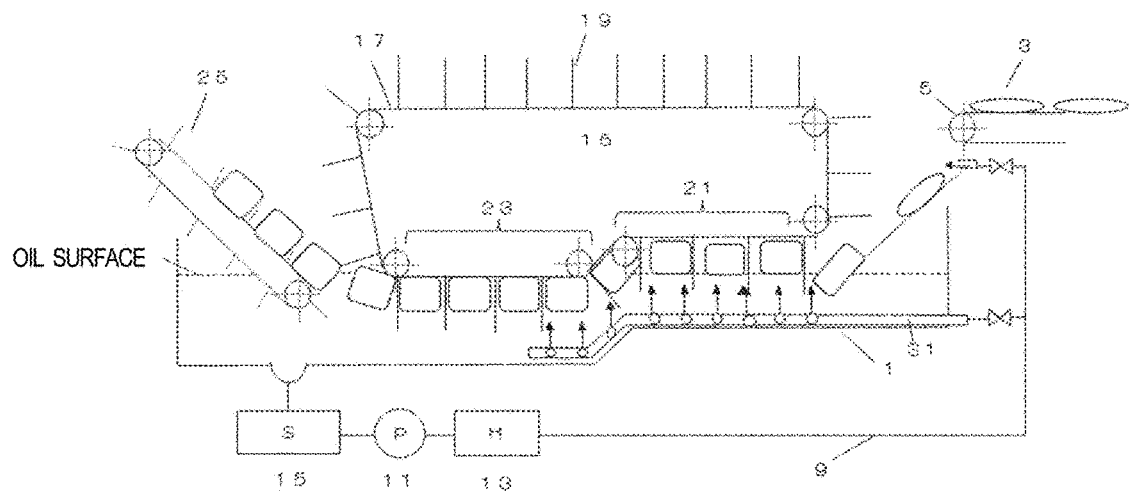
FIG. 2 is a cross sectional schematic view of a noodle string frying treatment apparatus according to a second embodiment of the present invention.

In a second embodiment of the present invention shown in FIG. 2, a frying oil ejection mechanism 27 is provided, which ejects frying oil in the upward direction from the underside of the frying oil tank 1 in supplying the frying oil again to the frying oil tank 1 through the heat exchanger.

With the provision of the frying oil ejection mechanism, it is possible to generate a flow of the frying oil in the upward direction from the underside in the frying oil.

In the present invention, groups of foods to be fried are fed into the frying oil tank 1, and a frying treatment is applied to the groups of foods in a floating state. At this time of operation, the groups of foods are transported in the downstream direction by the paddles as shown in the first transport mechanism 21. Thereafter, the groups of foods are forcibly immersed below a surface of frying oil by the second transport mechanism 23 so that the groups of foods are deep fried.

In this embodiment, with the use of the frying oil ejection mechanism, a relative position between the groups of foods is disturbed in a state where the groups of foods, to which a frying treatment is applied, are fried in a floating state in the first transport mechanism 21. Accordingly, after the groups of foods are deep fried in the latter stage, the groups of foods can be separated from each other more easily and hence, efficiency in frying foods can be enhanced.

To be more specific, it is effective to eject frying oil through holes 29 formed in a tube or the like from a bottom portion side of the frying oil tank 1 toward groups of foods conveyed by the first transport mechanism 21. In the second embodiment of the present invention, as shown in FIG. 2, the frying oil ejection mechanism 27 is provided which ejects frying oil from an underside portion of the frying oil tank 1, and also has a function of making the frying oil circulate (from the downstream to the upstream).

A mode is shown where the ejection mechanism 27 is used within a range where groups of foods are transported by the first transport mechanism 21 and an area immediately after transport of the groups of foods by the second transport mechanism 23 is started. However, it is preferable that ejection of frying oil be performed within a region of the first transport mechanism 21. It is the most preferable that the frying oil be ejected until a starting point of a region of the second transport mechanism 23.

FIG. 2 shows a mode different from the mode shown in FIG. 1 with respect to a frying oil ejection mechanism which ejects frying oil in the upward direction from the underside of the frying oil tank 1.

FIG. 2 shows the mode where a tubular member 31 is disposed on a lower portion of the frying oil tank 1, and a plurality of holes directed in the upward direction are formed in the tubular member 31. Frying oil flowing out from the downstream side within the frying oil tank 1 is conveyed to the upstream side by the pump, and the frying oil is made to flow in the frying oil tank 1 from the tube.

Further, the holes directed in the upward direction are formed in the tubular member 31 and hence, the frying oil flowing in the frying oil tank 1 is ejected in the upward direction from the bottom portion of the frying oil tank 1. With such a configuration, a relative position between groups of frying foods which are disposed between the paddles 19 is disturbed. Accordingly, in the same manner as the case shown in FIG. 1, the group of foods can be easily separated from each other after the group of foods is deep fried in the latter stage.

In FIG. 1 and FIG. 2, a region is divided by the paddles arranged at predetermined intervals so that spaces are formed, each of which is divided by the paddles and the net-like belt forming an upper portion of the space. Frying oil is made to flow in the frying oil tank 1 from a lower portion of the frying oil tank 1 toward frying foods floating in the divided spaces so that the frying foods are agitated in each space. With such agitation of the frying foods, the frying foods are circulated by convection so that the frying foods are uniformly fried whereby surplus moisture is volatilized relatively rapidly.

Oil which is made to flow in the fry tank from the bottom portion of the fry tank is oil heated through the heat exchanger and hence, there is an advantage that oil immediately after passing through the heat exchanger is made to flow in the fry tank toward frying foods.

It is needless to say that, as shown in FIG. 1, only a portion of the whole frying oil heated through the heat exchanger may be made to flow in the fry tank from the bottom portion of the fry tank. That is, FIG. 1 also shows an inflow passage which is connected to the fry tank on the upstream side of the fry tank in the horizontal direction on a paper on which FIG. 1 is drawn.

The bottom portion side described in 3) in Claim 1 of the present invention does not indicate only an underside in a strict meaning. It is sufficient to obtain an effect of agitating a group of foods which is fried in a floating state. Accordingly, for example, the present invention also includes a case where oil is ejected in the oblique upward direction from a lateral side portion.

—Fried Food Collection Mechanism—

In the present invention, the collection mechanism 25 is provided, which collects fried foods from the frying oil tank 1. In the first embodiment of the present invention, a mechanism is described which collects groups of foods after the second transport is finished such that the frying treatment is completed from the frying oil tank 1 by a collection conveyor having paddles.

—Configuration in Case of Group of Short Noodle Strings—

[1] In Case where Apparatus is Utilized as Short Noodle String Frying Apparatus

The frying treatment apparatus of the present invention can be utilized as a treatment apparatus particularly for short noodle strings (about 1 to 10 cm). That is, when the present invention is utilized as a short noodle string frying apparatus, the frying treatment apparatus of the present invention has the following configuration, for example.

"A noodle string frying treatment apparatus including:

1) a frying oil tank:

2) a noodle strings supply mechanism which feeds steamed and cut noodle strings having a length of 1 to 10 cm, the noodle strings supply mechanism being disposed on an upstream side of the frying oil tank;

3) a frying oil circulation mechanism which makes frying oil flow out from the frying oil tank on a downstream side within the frying oil tank, and makes the frying oil flow in the frying oil tank on the upstream side within the frying oil tank by a frying oil inflow device which ejects the frying oil in an upward direction from a bottom portion side of the frying oil tank;

4) a heat exchanger which reheats the frying oil made to flow out from the frying oil tank;

5) a frying noodle strings transport mechanism which transports the noodle strings fed into the frying oil from the upstream side to the downstream side, the frying noodle strings transport mechanism being disposed in the oil tank, and including a first transport mechanism which transports the noodle strings fed into the frying oil tank on the upstream side within the frying oil tank in a floating state on a surface of the frying oil, and a second transport mechanism which transports the frying noodle strings subsequently to the first transport mechanism in an immersed state below the surface of the oil in the frying oil tank; and 6) a fried noodle strings collection mechanism which collects the fried noodle strings from the frying oil tank."

—Movement of Fed Noodle Strings—

Next, a step of frying groups of noodle strings in the first embodiment of the present invention is described. First, cut noodle strings are fed into the frying oil tank 1 from an end portion of the frying oil tank 1 on the upstream side in order. The groups of fed noodle strings are fed into frying oil and, first, are fried in a floating state in the first transport mechanism 21. The groups of frying noodle strings are fried and, at the same time, are divided by the plurality of paddles arranged at predetermined intervals. Then, the groups of frying noodle strings are conveyed by the paddles along with advance of the conveyor, and are conveyed to the downstream side in order.

In the course of frying, the groups of noodle strings are transferred to the second transport mechanism 23 where the conveyor 17 is lowered to an area around a surface of frying oil so that the groups of noodle strings which are divided by the paddles 19 and are fried in a floating state are fried in an immersed state in the frying oil (deep frying).

After the groups of noodle strings are deep fried for a predetermined time, the frying step is finished. The groups of fried noodle strings which are elevated from the liquid surface are discharged from the frying oil tank 1 by a separated noodle strings collection mechanism (a conveyor having paddles) 25, and the groups of fried noodle strings can be collected in a separated state. In the case where the frying noodle treatment apparatus of the present invention is used, even when there are lump portions where fried noodle strings are formed into an integral body, the noodle strings can be easily separated from each other by applying vibrations or a small shock to the noodle strings. The group of noodle strings obtained in this manner advances to the next step through a step of being packaged into a packing material (cup container or the like) and other steps and, eventually, a product is completed.

—Configuration in Case of Producing Potato Chips—

[2] In Case where Apparatus is Utilized as Potato Chip Frying Treatment Apparatus The frying treatment apparatus of the present invention can be favorably utilized for frying not only the above-mentioned groups of short noodle strings but also potato chips.

That is, when the frying treatment apparatus of the present invention is used as a potato chip frying treatment machine, the frying treatment apparatus of the present invention has the following configuration, for example.

"An apparatus for producing potato chips including:
1) a frying oil tank:
2) a supply mechanism which feeds cut sliced potatoes, the supply mechanism being disposed on an upstream side of the frying oil tank;
3) a frying oil circulation mechanism which makes frying oil flow out from the frying oil tank on a downstream side within the frying oil tank, and makes the frying oil flow in the frying oil tank from the upstream side within the frying oil tank, the frying oil being made to flow in the frying oil tank by a frying oil inflow mechanism which ejects the frying oil in an upward direction from a bottom portion side of the frying oil tank;
4) a heat exchanger which reheats the frying oil made to flow out from the frying oil tank;
5) a sliced potatoes transport mechanism which transports sliced potatoes fed into the frying oil from the upstream side to the downstream side, the sliced potatoes transport mechanism being disposed in the oil tank, and including a first transport mechanism which transports the sliced potatoes fed into the frying oil tank on the upstream side within the frying oil tank in a floating state on a surface of the frying oil, and a second transport mechanism which transports the sliced potatoes subsequently to the first transport mechanism in an immersed state below the surface of the frying oil in the frying oil tank; and
6) a potato chips collection mechanism which collects the fried potato chips from the frying oil tank."

With the use of the frying apparatus having such a configuration, sliced potatoes which are raw materials stored in spaces defined by the paddles are fried while being agitated due to the ejection of the oil from the bottom portion of the frying oil tank. That is, slice potatoes are moved around so that the potatoes are agitated and, at the same time, the slice potatoes are efficiently fried by the oil which is ejected from the bottom portion of the frying oil tank and is subject to heat exchange. Accordingly, it is possible to increase efficiency in frying potatoes.

As described above, the use of the present invention as the potato chip frying treatment apparatus is effective in separating fried potato chips. Conventionally, a frying temperature of about 170° C. to 180° C. is required. On the other hand, according to the present invention, a frying temperature can be lowered to about 170° C. to 160° C. Accordingly, potato chips having substantially the same quality as potato chips produced by the conventional technique can be produced while a frying temperature is lowered. Lowering of a frying temperature contributes also to the reduction of acrylamide.

EXAMPLE

A test was carried out so as to determine whether or not a frying treatment can be applied to a group of frying noodle strings in a separated state by the noodle string frying treatment apparatus of the present invention.

<Example 1> Present Invention Producing Method 1 (Noodle Strings being Fried in Floating State with Ejection of Frying Oil)

A treatment was applied to a group of noodle strings using the frying treatment apparatus shown in FIG. 2. A raw material containing wheat flour, starch and kansui was kneaded, mixed, rolled out and cut thus preparing raw noodle strings. Then, the raw noodle strings were gelatinized by steaming the raw noodle strings and, thereafter, were cut with a length of 3 cm so as to prepare short noodle strings. A group of short noodle strings prepared as described above were fed into the frying treatment apparatus (frying temperature of 150° C.) shown in FIG. 1, and a frying treatment was applied to the group of short noodle strings for 45 seconds by the first transport mechanism and for 40 seconds by the second transport mechanism. That is, the frying treatment was applied to the group of short noodle strings for 85 seconds in total. Thereafter, the group of fried noodle strings was collected by the noodle strings collection mechanism (a conveyor having paddles). Frying oil was ejected in the upward direction from a bottom portion of the frying treatment apparatus.

<Comparison Example 1> Comparison Producing Method 1 (Noodle Strings being Fried in Floating State without Ejection of Frying Oil)

Figure 3:
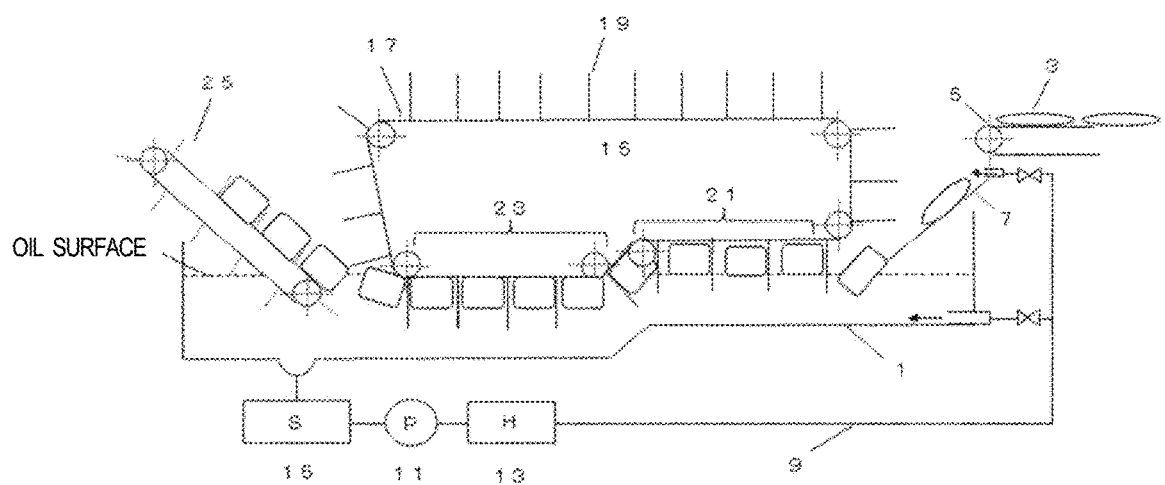
FIG. 3 is a cross sectional schematic view of a noodle string frying treatment apparatus according to Comparative Example of the present invention.

A treatment was applied to a group of noodle strings using a frying treatment apparatus shown in FIG. 3 (an apparatus where frying oil is not ejected in the frying oil in the upward direction from a bottom portion of the apparatus). A method of a frying treatment is substantially equal to the method in Example 1.

<Comparison Example 2> Comparison Producing Method 2 (Noodle Strings being not Fried in Floating State without Ejection of Frying Oil)

In the same manner as Comparative Example 1, the frying treatment apparatus shown in FIG. 3 was used, and an amount of frying oil in the frying oil tank was adjusted by increasing the frying oil such that whole paddles were immersed in the frying oil also in the first transport region. After the adjustment of the frying oil, a frying treatment was applied to a group of noodle strings in the same manner as Example 1. In this case, the frying oil reaches an upper portion of each paddle also in the first transport mechanism. That is, a mode was employed where the group of noodle strings was deep fried in the first transport mechanism and the group of noodle strings was continuously deep fried also in the second transport mechanism.

—Results—

In Example 1 and Comparative Example 1, the groups of fried noodle strings were brought into a state where some of the fried noodle strings were connected (lump portion) rather than a lump state. Accordingly, the group of fried noodle strings could be separated from each other by applying vibrations to the group of fried noodle strings.

In Example 1 (with ejection of frying), the group of noodle strings could be easily separated from each other compared to Comparative Example 1. Further, the number of lump portions was small compared to the case of Example 1, and more favorable "separation" could be realized. Further, a fried state of the respective noodle strings was more favorable compared to a fried state in Comparative Example 1.

Figure 4:
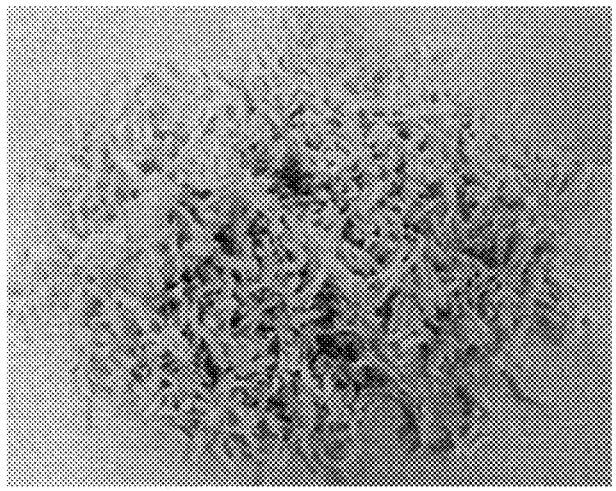
FIG. 4 is a photograph of a group of noodle strings of Example 1.
Figure 5:
FIG. 5 is a photograph of a group of noodle strings of Comparative Example 1.
Figure 6:
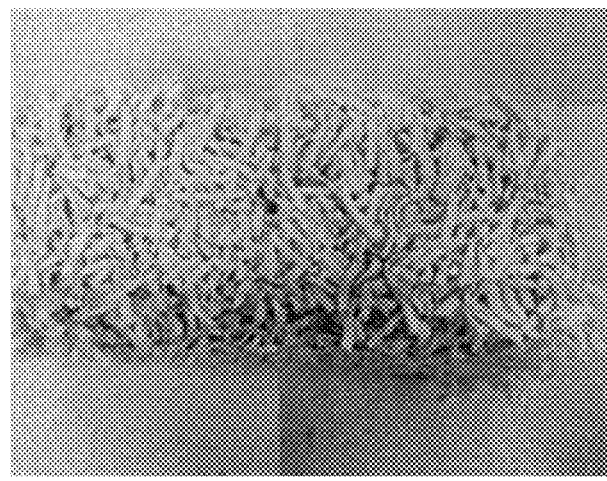
FIG. 6 is a photograph of a group of noodle strings of Comparative Example 2.

In Comparative Example 2, fried noodle strings were brought into a lump state. When a shock was applied to the noodle strings in the lump state, the noodle strings were only partially separated, and it was difficult to completely separate the group of noodle strings from each other. FIG. 4 to FIG. 6 are photographs of the groups of noodle strings of Example 1 and Comparative Examples 1 and 2 each of which is immediately after the group of noodle strings is fried.

The present application is based on Japanese Patent Application—application No. 2015-068552 filed on Mar. 30, 2015, and the contents of the application are included in this specification as a reference.

The invention claimed is:

1. A food frying treatment apparatus comprising:
   a frying oil tank;
   a raw material feeder, which feeds a food raw material for frying, the raw material feeder being disposed on an upstream side of the frying oil tank;
   a pump, which circulates frying oil so as for the frying oil to flow out from the frying oil tank on a downstream side of the frying oil tank, and to flow in the frying oil tank on the upstream side of the frying oil tank by ejecting the frying oil in an upward direction toward a top of the frying oil tank from a bottom portion side thereof so as to stir the food raw material and form a flow of the frying oil from the upstream side in the frying oil tank;
   a heat exchanger, which reheats the frying oil flowing out from the frying oil tank;
   a frying food transport conveyor, which transports the food raw material fed into the frying oil from the upstream side to the downstream side through a first fry area and a second fry area immediately downstream the first fry area,
      wherein the frying food transport conveyor is disposed in the oil tank and transports the food raw material immediately subsequent to the feeding of the food raw material from the raw material feeder,
      the frying food transport conveyor transports the food raw material fed into the frying oil tank on the upstream side within the frying oil tank in a floating state on a surface of the frying oil in the first fry area, and
      immediately subsequently to the transporting of the food raw material in the first fry area, the frying food transport conveyor further transports a resulting food under frying in an immersed state below the surface of the frying oil in the frying oil tank in the second fry area; and
   a fried food collection conveyor, which collects the resulting fried food from the frying oil tank,
   wherein the frying food transport conveyor comprises: a belt, which moves in a direction from the upstream side to the downstream side; and a plurality of sorting plates, which are provided to the belt at decided intervals and divide the food raw material under frying into groups at the intervals, and
   wherein immediately subsequent to the feeding of the food raw material from the raw material feeder, the food raw material is stirred by the ejected frying oil in a space formed between the plurality of the sorting plates of the frying food transport conveyor, while the frying food transport conveyor transports the food raw material in the floating state on the surface of the frying oil flowing from the upstream side to the downstream side in the first area.

2. A method for producing a fried food using a frying apparatus, wherein in the apparatus, frying oil flows from an upstream side to a downstream side in a frying oil tank, the frying oil flows out from the frying oil tank on the downstream side of the frying oil tank, and the frying oil passes through a heat exchanger and flows in the frying oil tank, the method comprising:
   feeding a food raw material for frying into the frying oil tank on the upstream side within the frying oil tank through a raw material feeder;
   frying the food raw material in a floating state on the upstream side within the frying oil tank, while transporting the food raw material from the upstream side to the downstream side through a first fry area and a second fry area immediately downstream the first fry area, by a frying food transport conveyor that is disposed in the oil tank and transports the food raw material fed into the frying oil tank immediately subsequent to the feeding,
      wherein the frying food transport conveyor transports the food raw material fed into the frying oil tank in the first fry area on the upstream side within the frying oil tank in a floating state on a surface of the frying oil;
   causing a flow of the frying oil from the upstream side to the downstream side in the frying oil tank by ejecting the frying oil on the upstream side within the frying oil tank in an upward direction toward a top of the frying oil tank from a bottom portion side thereof;
   immediately subsequently to the frying of the food raw material in the floating state in the first fry area, frying a resulting food under frying in the second fry area, in an immersed state below the surface of the frying oil by further transporting the resulting food raw material from the first fry area by the frying food transport conveyor, the frying food transport conveyor transporting the resulting food from the first fry area, in the second fry area under the frying in the immersed state; and
   collecting the fried food resulting from the frying in the immersed state from the frying oil tank by a fried food collection conveyor,
   wherein the frying food transport conveyor comprises: a belt, which moves in a direction from the upstream side to the downstream side; and a plurality of sorting plates, which are provided to the belt at decided intervals and divide the food raw material under the frying into groups at the intervals, and
   wherein immediately subsequent to the feeding of the food raw material from the raw material feeder, the food raw material is stirred by the ejected frying oil in a space formed between the sorting plates of the frying food transport conveyor, while the frying food transport conveyor transports the food raw material in the floating state on the surface of the frying oil flowing from the upstream side to the downstream side in the first area.

* * * * *